Aug. 5, 1969  K. AALAND ET AL  3,459,960
HIGH ENERGY PULSE GENERATOR UTILIZING A DECOUPLING TRANSFORMER
Filed May 2, 1967  2 Sheets-Sheet 1

INVENTOR.
KRISTIAN AALAND
BY OVED S. ZUCKER

ATTORNEY

Aug. 5, 1969  K. AALAND ET AL  3,459,960
HIGH ENERGY PULSE GENERATOR UTILIZING A DECOUPLING TRANSFORMER
Filed May 2, 1967  2 Sheets-Sheet 2

INVENTOR.
KRISTIAN AALAND
OVED S. ZUCKER
BY
ATTORNEY

United States Patent Office 3,459,960
Patented Aug. 5, 1969

3,459,960
HIGH ENERGY PULSE GENERATOR UTILIZING A DECOUPLING TRANSFORMER
Kristian Aaland and Oved S. Zucker, Livermore, Calif., assignors to the United States of America as represented by the United States Atomic Energy Commission
Filed May 2, 1967, Ser. No. 635,985
Int. Cl. H03k 3/64
U.S. Cl. 307—108                                                                           13 Claims

ABSTRACT OF THE DISCLOSURE

A high energy pulse generator is disclosed wherein a unique saturable core transformer featuring enhanced decoupling during saturation is arranged between a charged capacitor and a load for automatically producing time-separated rectangular voltage pulses of alternately opposing polarity across the load. Furthermore, an embodiment of the invention is described in which a short duration, high energy trapezoidal current pulse is generated in an inductive load.

Background of the invention

The invention relates to pulse circuitry, and more particularly to the class of pulse circuits incorporating nonlinear magnetic components.

It is often desirable in the art to provide kilovolt or kiloampere rectangular or trapezoidal shaped electrical pulses exhibiting microsecond rise and fall times, together with generally constant peak amplitudes. For example, in the field of plasma physics, kiloampere current pulses having fast response times are a requisite for generating high energy transient magnetic fields of short duration. Typical engineering problems encountered in this high energy pulse art are associated with the inability of conventional circuit components to cope with the large inertial forces attendant high-energy signals. For example, common attempts at abruptly terminating a high current in an energized inductive load have generally resulted in arcing and rapid destruction of the circuit. Moreover, difficulty has been observed in the efforts of engineers to shape these high energy pulses into sharp, rectangular or trapezoidal configurations, especially in circuits involving capacitors and/or inductors where inertial oscillations and thus exponential or sinusoidal wave forms tend to dominate.

Summary of invention

Accordingly, it is a broad object of the invention to provide a pulse generator circuit having a saturable core transformer capable of producing sharp rectangular voltage pulses having tens of kilovolt amplitude and nanosecond rise and fall times.

It is a further object of the invention to provide a saturable core transformer having a near unity magnetic coefficient of coupling during nonsaturation and a coefficient of coupling approaching zero during saturation.

It is a more particular object of the invention to provide a pulse generator circuit capable of inducing in an inductive load a trapezoidal current pulse having a microsecond rise and fall time, together with a tens of kiloampere amplitude.

Pursuant to these objects, the invention provides a pulse circuit utilizing a saturable core transformer to govern the electrical discharge of an energized capacitor into a resistive and/or inductive load, wherein the resulting voltage wave shape across the load is comprised of alternately polarized, time-separated rectangular voltage pulses. More particularly, a saturable core transformer having primary and secondary windings and a given saturation flux density is arranged between a load and an initially voltage-charged capacitor operating in combination therewith to sequentially couple and decouple the capacitor across the load such that during the decoupling period an oscillatory reversal of the capacitor voltage polarity occurs, followed by another period of coupling of the capacitor across the load. During the coupling modes, the core of the transformer is nonsaturated, thereby allowing near perfect electrical transformation of the capacitor voltage across the load; during the intervening decoupling mode, the core is saturated, providing substantial electrical isolation of the capacitor from the load. The reversal of the capacitor voltage during the decoupling period is provided by a half period oscillation between the capacitor and the primary winding inductance, which inductance exhibits a low value during saturation of the core. As a result, the load receives a first rectangular voltage pulse during a first of the coupling modes, and a second rectangular voltage pulse of opposite polarity during a second of the coupling modes, wherein these pulses are separated by a zero voltage period during the decoupling mode. This resulting rectangular bipolar pulse output is somewhat unexpected due to the fact that the circuit is comprised solely of lumped passive components, as it would be anticipated that the voltage reversal in the primary circuit would necessitate an active component device, such as a bistable multivibrator.

As a significant aspect of the invention, the output voltage pulses and output impedance characteristics of the circuit are particularly adapted for generating a tens-of-kiloampere trapezoid current pulse in an inductive load. In such an embodiment, the alternately polarized voltage pulse pair, together with the low impedance shunt of the secondary winding during saturation, provide a means for first energizing the coil load to a high current with the first voltage pulse during coupling, maintaining this current at a constant level for the duration of the decoupling mode and abruptly terminating it with the opposite poled voltage pulse occurring during the following coupling mode.

For advantageous operation of this pulse circuit, the saturable core transformer should provide nearly perfect electrical transformation during the coupling mode and essentially zero electrical transformation during decoupling. This necessitates a transformer having a coefficient of coupling approaching unity during non-saturation of the core and coefficient approaching zero during saturation. However, conventional saturable core transformers have substantial flux linkage between input and output winding even during saturation of the core, thus maintaining some electrical transformation between the windings.

Accordingly, this invention provides, as another aspect thereof, a "decoupling" transformer exhibiting coefficients of coupling approaching unity and zero respectively during nonsaturation and saturation of the transformer core. In general, this "decoupling" transformer, including a primary winding and saturable core, is characterized by a polar reverse coil disposed in an air space external to the core and serially connected with and forming a portion of a secondary winding. As described more fully herein, the reverse coil intercepts leakage flux generated within the air space during saturation of the core, and cancels the effect of the above-mentioned persisting flux linkage between the primary and secondary windings during core saturation.

As another aspect of the invention, the "decoupling" transformer is incorporated in the pulse circuit in operable combination for enhancing the operation of the circuit thereby, providing sharp and distinct rectangular shaped voltage pulses while substantially eliminating the appearance of undesirable voltage transients across the load during the decoupling mode.

Brief description of the drawings

Further objects and features of the invention will be recognized by those skilled in the art, and a more complete understanding of the invention itself will be obtained by reference to the following detailed description of preferred embodiments, taken in conjunction with the appended drawings, in which.

Description of the preferred embodiments

Figure 1:
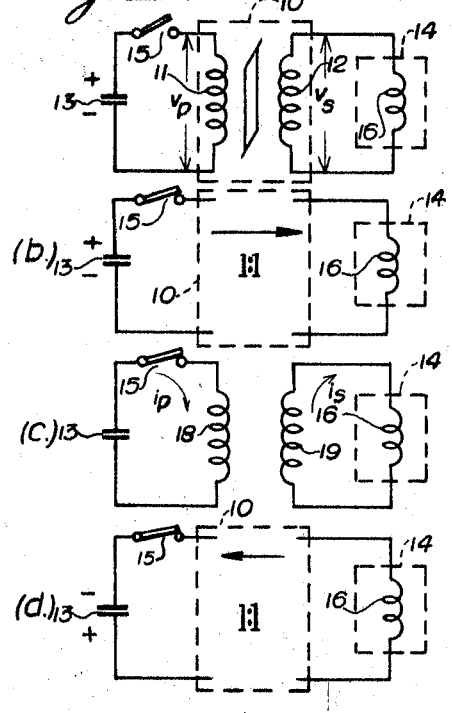
FIGURES 1a, b, c and d illustrates a simplified form of the pulse circuit and schematically depicts the coupling and decoupling modes of operation thereof.

Referring particularly to FIGURE 1a, a schematic of the pulse circuit is shown, wherein a saturable core transformer 10 having primary and secondary windings 11 and 12 is adapted to be connected between a capacitor 13 and load 14 by switch 15. For exemplifying an application of the circuit, load 14 is an inductive coil 16; however, any electrical load which is primarily resistive and/or inductive may be used. In combination with the above circuit topology, shown in FIGURE 1a, the invention includes certain significant features relating to the selection of component values, essential to provide the unique output waveshape. These latter features are best described in conjunction with the operation of the circuit, for which purposes FIGURES 1b, c and d, and FIGURE 2 have been included.

Figure 2:
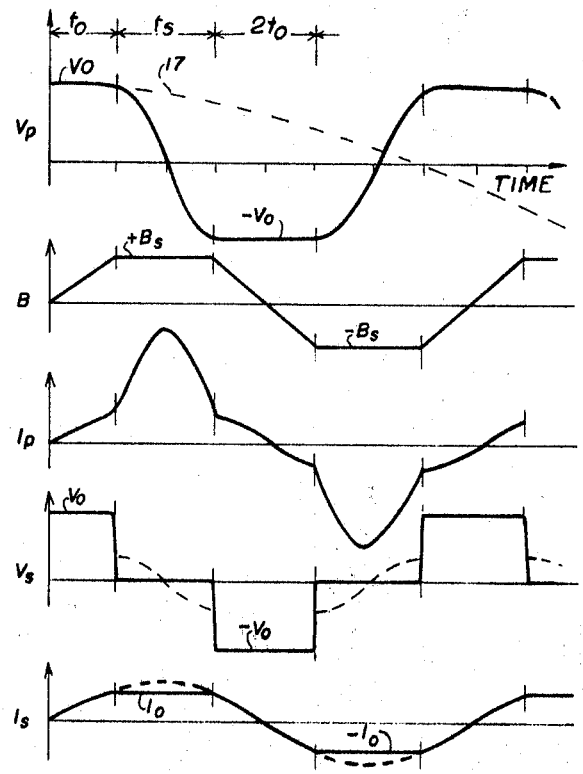
FIGURE 2 shows the voltage and current waveshapes appearing in the circuit of FIGURE 1.

Briefly, in operation, capacitor 13 is charged to an initial voltage $V_0$ as shown in FIGURE 2 (by means not shown). Upon closure of switch 15, transformer 10 provides, among other functions, an electrical coupling-decoupling-coupling sequence automatically in response to the voltage across capacitor 13.

To provide a background for understanding this operation, a short characterization of the saturable core transformer is desirable. The core of transformer 10 is capable of accepting only a finite flux density, i.e., limited by the saturation flux density $B_s$, as shown in FIGURE 2, and thus can maintain a specific voltage, V, across primary winding 11 for a limited time, $\tau$, before saturation of the core occurs, where $\tau = t_0$. Expressed in equation form, the appropriate formula is:

$$B_s = \frac{1}{NA} \int_0^\tau V\,dt \tag{1}$$

where N is the number of turns in winding 11, A is the cross sectional area of the core, V is the voltage across primary winding 11, and t is real time. From this equation, $\tau$, the time required to saturate the core, may be calculated. For example, if V were equal to a constant value, $V_0$, then $t_0$ would be defined as:

$$t_0 = B_s NA / V_0 \tag{2}$$

Thus, after an application of voltage, $V_0$ across the primary winding 11 for a duration $t_0$, the core saturates, substantially decreasing the transformation of electrical signals between windings 11 and 12 of transformer 10.

For the purpose of describing the fundamental characteristics attendant the pulse circuit of FIGURE 1a, it will be assumed that transformer 10 exhibits a coefficient of coupling approaching unity during the nonsaturated state, and a coefficient approaching zero during the saturated state of the core. Accordingly, with reference to FIGURE 1b, immediately subsequent to thes closure of switch 15, capacitor 13 is electrically connected across load inductor 16, and for a unity turn ratio of primary and secondary windings 11 and 12, the transformation is 1:1 as shown. Furthermore, since capacitor 13 is charged to an initial voltage $V_0$, load inductor 16 and capacitor 13 enter into a natural cosine oscillation mode having an initial peak voltage amplitude of $V_0$, as shown by dotted line 17 of FIGURE 2. Now, as a significant feature of the invention, the period of oscillation defined by the shunt connection of capacitor 13 across inductor 16 is preselected to be substantially greater than $t_0$, the time duration required to saturate the core of transformer 10 with a generally constant voltage, $V_0$. FIGURE 2 shows the voltage and current waveshapes of the circuit during this initial time lapse, $t_0$, wherein $V_p$ is the voltage across winding 11, B is the flux density of the core of transformer 10, $I_p$ is the primary current, $V_s$ is the voltage across second winding 12, and $I_s$ is the secondary current. It is noted that $V_p$ during the time 0 to $t_0$ forms a small segment of the long period cosinusoidal oscillation between capacitor 13 and inductor 16, which in the absence of saturable core transformer 10, would continue as shown by dotted line 17. Also, during this initial time period, 0–$t_0$, which may be characterized as a first coupling mode, the core flux, B, increases to a saturation level $B_s$. Further still, the primary circuit current, $I_p$, starts in a sinusoidal oscillation as its wave form is complementary to the cosinusoidal oscillation of primary voltage $V_p$. Furthermore, the secondary voltage, $V_s$, during this period is coextensive with primary voltage, $V_p$, due to the 1:1 coupling provided by the transformer, while the secondary current, $I_p$, increases due to voltage $V_s$ applied across load 16.

After a time lapse equal to $t_0$, measured from the closure of switch 15, the core flux B reaches a saturation level $B_s$, as shown in FIGURE 2 and the circuit decouples, resulting in two separate network loops shown by FIGURE 1c. More particularly, the saturation of the core causes a substantial decrease in the coefficient of coupling of transformer 10, and for the purpose of explanation, it has been assumed that this coefficient approaches zero. Moreover, the saturated core exhibits a permeance $\mu$ on the same order of magnitude as $\mu_0$, i.e., the permeance of free space. Accordingly, the primary and secondary windings 11 and 12 appear essentially as air core coils having extremely low values of inductance. These effectively low value inductive coils are schematically indicate on FIGURE 1c, and denoted herein as primary saturated inductance 18 and secondary saturated inductance 19. Thus the mechanism of decoulping electrically isolates capacitor 13 from load inductor 16 and provides across each a separate low value inductive shunt. Again referring to FIGURE 2, the waveforms for this decoupling mode are shown to occur during a time period $t_s$. It is noted the voltage on capacitor 13 reverses polarity due to the half period natural oscillation between the capacitor and the primary saturated inductance 18. The primary current $I_p$ is driven to a high sinusoidal peak due to the exceedingly low value of inductance 18. In the secondary circuit, $V_s$ abruptly decreases to approximately zero, while $I_s$, circulating through load inductor 16 and shunt inductance 19, significantly is maintained at a constant high level, $I_0$, during this decoupling mode due to the inertial effect of the energized secondary coils.

The decoupling mode is terminated by the automatically responsive operation of transformer 10 to the primary voltage, $V_p$, which having reversed its polarity to ($-V_0$), draws the core out of saturation, again permitting normal transformer coupling between capacitor 13 and load inductor 16, as shown by FIGURE 1d. This second coupling mode produces a second voltage pulse across load 16, negatively polarized with respect to the voltage pulse occurring during the initial coupling mode. With reference to the waveform shown in FIGURE 2, note that the flux density, B, decreases through zero to a negative saturation level $B_s$, thus allowing a time lapse, $2t_0$, twice the initial coupling period, before saturation of the core is again reached. This occasions the longer duration of the second coupling period, $2t_0$, as indicated by the waveforms of FIGURE 2.

The circuit will continue to oscillate in this bimodal manner until interrupted by opening the primary circuit during a moment of low current flow therein, or until losses dissipate the initial energy stored in the circuit to a critical level at which saturation of the core of transformer 10 no longer occurs.

As mentioned above, load 14 need not be an inductor, conversely a resistive load selected to provide a relatively long time constant (analogous to the relatively long time period for capacitor 13 and inductor 16 discussed above) will in general provide the same unique operation of the pulse circuit. In such an embodiment, it will be appreciated that the secondary or output current $I_s$ waveform would be of the same shape as the output or secondary output voltage, $V_s$, shown in FIGURE 2.

In the foregoing description, it was assumed that the saturable core transformer switched from a coefficient of coupling equal to unity to a coefficient equal to zero. In practice, it has been found that the coefficient of coupling for a typical saturable core transformer only decreases to value within the range of .2 to .8 during saturation of the core. This persistent coupling between the windings of the transformer causes undesirable perturbations in the secondary voltage and current waveshapes during decoupling as shown by the dotted lines for $V_s$ and $I_s$ in FIGURE 2.

In order to eliminate this continued coupling, we have incorporated in a preferred embodiment of the pulse circuit a "decoupling" transformer (as distinguished from a typical saturable core transformer) shown separately in simplified form by FIGURE 3. Included therein is a saturable magnetic core 25, a primary winding 11 and a secondary winding 12, including a reverse coil segment 26 arranged to encircle a spatial area external to core 25.

Figure 3A:
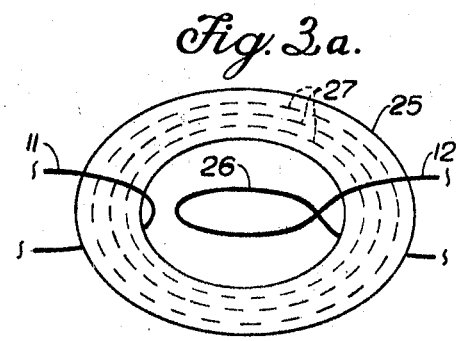
FIGURES 3a and 3b illustrate a "decoupling" transformer, in a nonsaturated condition and in a saturated condition respectively, employing a reverse coupling coil.
Figure 3B:
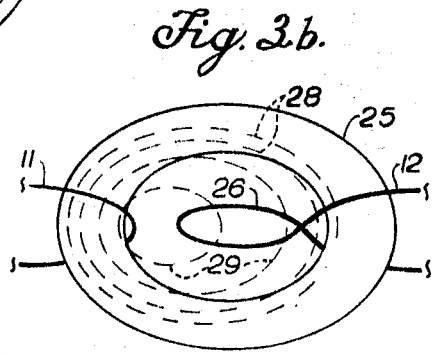

It is well known that a non-saturated transformer core exhibits a high permeability, thus generally providing for the confinement of magnetic flux within the boundaries of the core. Conversely, a saturated core has a permeability approaching that of free space, e.g., $\mu_s = 2\mu_0$, and accordingly permits magnetic flux to distribute itself with essential independency to the core boundaries, i.e., a portion of the flux generated by an energized winding will traverse the core boundaries and emerge in the spatial region surrounding the core and winding. FIGURE 3 illustrates how this spatially-generated flux is utilized to provide, during saturation of core 25, complete magnetic decoupling between primary and secondary windings 11 and 12. Particularly FIGURE 3a shows core 25 in a state of high permeability, non-saturation, wherein flux lines 27 are entirely confined to core 25 and windings 11 and 12 have a mutual flux linkage approaching unity. On saturation of core 25, the flux pattern switches to that shown in FIGURE 3b, wherein the effect of persisting flux linkage between the windings denoted by dotted lines 28 is cancelled by the interception of an equal amount of spatially generated flux, denoted with dotted lines 29, by the reverse coil segment 26 of secondary winding 12. It is noted that reverse coil segment 26 does not effect the flux linkage and thus the coupling of the windings during nonsaturation (FIGURE 3a) as substantially the whole of the flux is confined within the core, thus circumventing reverse coil segment 26. In capsule, the "decoupling" transformer provides a mutual flux linkage approaching unity during nonsaturation, while providing a *net* mutual flux linkage approaching zero during saturation of core 25. This device is particularly suitable for use in the pulse circuit shown in FIGURE 1a, permitting enhanced sharpness of the output waveforms for $V_s$ and $I_s$ shown in FIGURE 2. More particularly, through the incorporation of this novel "decoupling" transformer, the waveshapes for $V_s$ and $I_s$ during decoupling conform to the desired sharp solid lines shown in FIGURE 2, rather than the superimposed dotted lines which illustrate the substantial distortion of the desired waveshapes resulting from the use of a transformer not having the novel decoupling mechanism of reverse coil 26.

Figure 6:
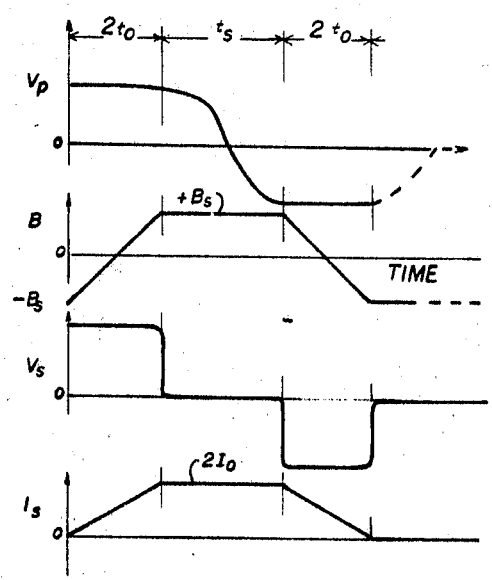
FIGURE 6 illustrates the waveforms of the circuit shown in FIGURE 4.

A particular embodiment of the basic pulse circuit shown in FIGURE 1a has proved exceedingly useful for generating a 16 kiloampere trapezoidal current pulse in a $5\mu$ H inductive load with rise, fall and width times, each approximating $4\mu$ sec. duration. More particularly, the circuit shown in FIGURE 4, including a preferred "decoupling" transformer 50 illustrated in FIGURE 5, was utilized for this application. Additionally, the embodiment in FIGURE 4 includes a means for electrically interrupting the primary circuit loop after successive coupling and decoupling modes, specifically a resistive fuse 51; and means for biasing the flux density of the core of transformer 50, including a bias winding 52 disposed about the core 25 and adapted with terminals 53 and 54 (as shown in FIGURE 5), a choke 55, and a DC source 56 connected in series across bias winding 52. The flux biasing means is utilized to saturate core 25 to a negative saturation level, $-B_s$, prior to operation of the pulse circuit for the purposes of both eliminating the negative-going portion of the secondary current waveform, $I_s$, shown in FIGURE 2, and moreover for doubling the positive peak amplitude of $I_s$. Accordingly, in comparing the waveforms of FIGURE 2 with those appearing in the circuit of FIGURE 4, as illustrated by FIGURE 6, it will be noted in FIGURE 6 that: (1) flux density, B starts at $-B_s$; (2) the time duration for the first and second coupling periods, $2t_0$, are equal; and (3) the secondary current rises to twice $I_0$ and subsequently falls to zero.

Figure 4:
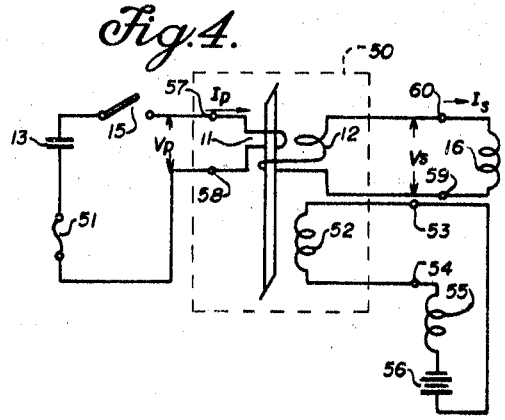
FIGURE 4 is a schematic diagram of a preferred form of the circuit of FIGURE 1.
Figure 5:
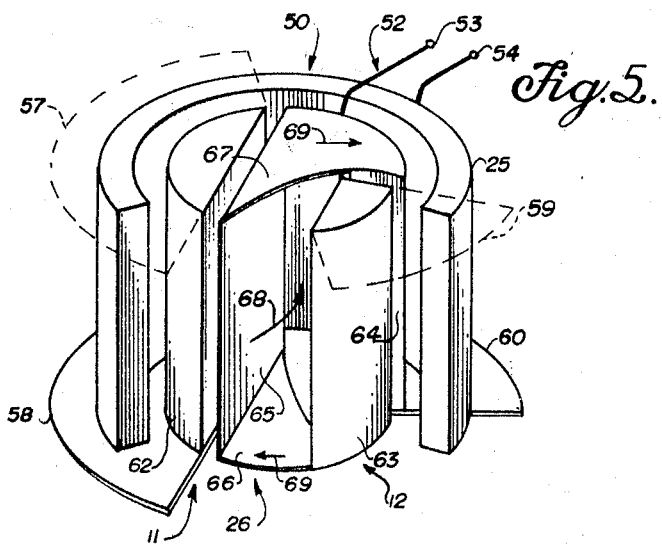
FIGURE 5 depicts an advantageous version of the "decoupling" transformer of FIGURE 3.

In design of the circuit of FIGURE 4 and the incorporated "decoupling" transformer 50 shown in FIGURE 5, the following considerations and formulas are of significance.

Given a desired peak load current, $2I_0 = I_0'$ (e.g., 16 kiloamperes) rise and fall time, $2t_0 = t_0'$ (e.g., $4\mu$ sec.), and load inductance $L_L$ (e.g., $5\mu$ H), the initial capacitor voltage, $V_0$ may be calculated from:

$$I_0' = 1/L_L \int_0^{t_0'} V dt = V_0 t_0'/L_L \qquad (3)$$

Also, from Equation 2 above, the rise and fall time, $t_0'$, and the initial voltage $V_0$ determines the desired saturation flux density, $B_s$, core area, A, and turns, N.

$$NAB_s = V_0 t_0'/2 \qquad (4)$$

In selecting the permissible relationship between the load inductance, $L_L$, and capacitor value, C, to provide a long period of cosinusoidal oscillation in comparison to the time, $t_0'$, required to drive the core from $-B_s$ to $+B_s$, it is necessary to consider the characteristics of the cosine function during its incipiency.

After a lapse of $\frac{1}{20}$ of a period, a cosine waveform is attenuated 5% from the peak magnitude. This is an acceptable drop in the voltage across capacitor 13, i.e., primary voltage, $V_p$, during the coupling period, $t_0'$. Accordingly, taking $t_0'$ equal to $\frac{1}{20}$ of the natural period of oscillation of capacitor 13, C, and inductor 16, $L_L$, the following formula is derived for the value of C:

$$C = 10(t_0'/L_L)^2 \qquad (5)$$

In designing "decoupling" transformer 50 of FIGURE 5 to provide for a desired decoupling time period, $t_s$, it is necessary to select a particular value ($L_p$) for the primary winding saturated inductance. This is readily appreciated by referring to FIGURE 1c, showing the effective primary circuit during decoupling, and noting that the decoupling period is approximately defined by the half period resonant oscillation between capacitor 13 and the primary winding saturated inductance 18. Accordingly, $L_p$, the value for the primary saturated inductance, may be approximated by the formula:

$$L_p \cong t_s^2/\pi 2C \qquad (6)$$

Furthermore, the saturated secondary inductance, schematically illustrated in FIGURE 1c as inductance 19, should be rendered as small as possible in order to maximize the energy delivered to load inductor 16, with which the secondary current is shared by inductance 19.

Both of these latter design factors require exceedingly low value saturated inductances, e.g., less than 100 nanohenries in certain fast pulse response applications.

Thus, in "decoupling" transformer 50, shown in FIGURE 5, primary and secondary windings 11 and 12 are formed of single turns in order to minimize the inductive reactances thereof. Particularly in FIGURE 5, primary winding 11 encircling core 25 is comprised of bar conductor 62 with attached fan-shaped terminals 57 and 58, wherein the primary current, $I_p$, flows from terminal 58 to terminal 57. Secondary winding 12, having fan-shaped terminals 59 and 60, includes a reverse loop segment 26 comprised of bar conductors 63 and 64 and a rectangular sheet conductor 65, which is arranged proximate bar conductor 62 and is connected to separate alternate ends of bar conductors 63 and 64 by complementary arranged arcuated bridge conductors 66 and 67, respectively. Segment 26 forms a generally rectangular window, as shown by arrow 68, for intercepting a sufficient amount of spatial flux within the volume space defined by the inner diameter of toroidal core 25 for cancelling the coupling between windings 11 and 12 during saturation of core 25. To further enhance the interception of spatial flux by reverse loop segment 26, conductor 65 is disposed in close proximity to primary bar conductor 62 to minimize flux leakage therebetween, requiring the flux to encircle the reverse loop segment 26. The current flow in secondary winding 12, as shown by arrows 69, proceeds from terminal 59, through bar conductor 63, along bridge conductor 66 to sheet conductor 65, to bridge conductor 67, down bar conductor 64 to fan terminal 60. Fan-shaped terminals 58, 59, 60 and 61 are included to provide for confinement of leakage flux tending to escape the outer surfaces of core 25 during saturation thereof, thereby further minimizing the saturated inductances of windings 11 and 12.

For the derivation of the equations herein, and for further engineering details relating to the disclosed embodiments of the invention, reference may be made to UCRL–14511–T, Rev. 1, obtainable from the Technical Information Division of Lawrence Radiation Laboratory, Livermore, Calif.

In summary, the invention provides a pulse generator capable of shaping high energy voltage signals into sharp, well-defined, generally rectangular, alternately opposite polarity, voltage pulses. Applications for such a device are found generally in the art of high energy pulse circuitry, and while a specific employment has been suggested, i.e., plasma research, this by no means exhausts the possible uses for our invention. Furthermore, the description herein is purely exemplary, and should not be construed as being representative of all of the modifications possible in embodying the fundamental features of the invention. For example, it is suggested that a variable inductor may be serially inserted in the primary winding of the circuit of FIGURES 1a or 4, for controlling the time period of decoupling, i.e., the half period of primary circuit oscillation between capacitor, C, and the primary saturated inductance, $L_p$. Furthermore, the initial capacitor voltage, $V_0$, may be varied to adjust the coupling period time lapse and thus the width of the secondary bipolar voltage pulses.

We claim:

1. An electrical pulse circuit for generating bipolar rectangular shaped high voltage pulses from an electrically passive stored energy source, comprising:

(a) a capacitor arranged with terminals for charging to an initial voltage;
   (b) an electrical load having a value selected for maintaining the voltage on said capacitor substantially at said initial voltage for a relatively long time period when connected in shunt with said capacitor;
   (c) a passive electrical bimodal means having an input connected across said capacitor and an output connected across said load; said bimodal means including a saturable core transformer automatically responsive to the voltage on said capacitor, successively switching between a first and second mode within said long time period for providing an electrical coupling period between said input and said output during the first mode, and for providing an electrical decoupling period between said input and output, together with separate relatively low value inductive shunts across said input and output during the second mode, whereby distinct time-separated rectangular voltage pulses of opposing polarity are applied across said load.

2. An electrical pulse circuit for generating bipolar voltage pulses, comprising:

(a) a capacitor arranged with terminals for charging to an inital voltage;
   (b) an electrical load having a value selected for maintaining the voltage on said capacitor substantially at said initial voltage for a relatively long time period when connected in shunt with said capacitor;
   (c) a decoupling transformer comprising a saturable magnetic core having distinct states of high permeability during nonsaturation and low permeability during saturation; a primary winding encircling said core and a secondary winding means including a first segment encircling said core and a second segment polar-reversed relative to said first segment for providing between said primary winding and secondary winding means a coefficient of coupling approaching unity and zero during nonsaturation and saturation, respectively; said decoupling transformer arranged with said secondary winding means electrically communicating with said load and said primary winding adapted to be connected across said capacitor for cooperating with said capacitor and said load, such that the initial capacitor voltage causes said core to saturate within said long time period to provide successive coupling and decoupling periods between said capacitor and load; said coupling and decoupling periods occurring respectively during nonsaturation and saturation of said core; whereby said load receives a rectangular bipolar voltage pulse waveform thereacross.

3. The apparatus recited in claim 1, further defined by said load being inductive.

4. The apparatus recited in claim 3, further defined by said bimodal means having a 1:1 electrical transformation ratio during said coupling mode.

5. The apparatus recited in claim 4, wherein said inductive load and said capacitor are selected to provide, when connected in shunt, a natural oscillation period at least 10 times the time duration of said coupling period.

6. The circuit recited in claim 2, where said load is an inductor.

7. The circuit of claim 6 further defined by said capacitor and inductor load selected to provide said long time period of at least 20 times the time duration required to saturate said core.

8. The circuit recited in claim 6, further including a switch means serially arranged between said capacitor and said primary winding for electrically connecting said capacitor across said primary winding; and further including a means for biasing said core in a first saturated state such that said coupling period occurs during a traversal of said core from said first saturated state to a second saturated state.

9. The circuit recited in claim 8 wherein said biasing means is comprised of a direct current source, serially connected with a choke and a bias winding; said bias winding communicating with said core.

10. The apparatus of claim 9, further defined by said core of said decoupling transformer defining a toroidal shape; said primary winding having a single turn and comprised of bar conductor traversing the annular opening defined by said toroidal core and said primary winding having a first set of semicircular fan-shaped terminals rigidly electrically fixed to opposite ends of said bar conductor and extending perpendicular therefrom across side surfaces of said core; said first set of fan-shaped terminals adapted to receive said capacitor thereacross through said switch means; said first and second segments of said secondary winding means being comprised of a continuous electrical path wherein said first segment is comprised of two bar conductors traversing said annular opening, each having a second set of fan-shaped terminals rigidly electrically fixed to first alternate opposite ends thereof; said second set of fan-shaped terminals extending perpendicularly from said bar conductors across side surfaces of said core and said second set of fan terminals adapted to receive said inductor load; and wherein said second segment is comprised of a generally thin sheet conductor having complementary arcuated bridge conductors perpendicularly fixed to opposite ends of said sheet conductor extending in a common direction therefrom; said second segment arranged with said bridge conductors electrically attached to second alternate opposite ends of said bar conductors of said secondary winding means to provide a closed electrical loop encircling an area in said annular opening and define said second segment; said area of said second segment being of dimensions selected to intercept an amount of said spatial flux equalling that amount intercepted by said first segment of said secondary winding.

11. The circuit of claim 9, further including a means for abruptly disconnecting said capacitor from said load subsequent to at least a first coupling and decoupling period.

12. The circuit of claim 10, wherein said means for disconnecting comprises a resistive fuse serially arranged between said capacitor and said primary winding.

13. The circuit of claim 2, further including a variable inductor serially arranged between said capacitor and said primary winding to provide time control of said decoupling period.

References Cited

UNITED STATES PATENTS

| 3,041,467 | 6/1962 | Auerbach | 307—88 |
| 3,161,783 | 12/1964 | Irmisch | 307—106 |

ROBERT K. SCHAEFER, Primary Examiner

T. B. JOIKE, Assistant Examiner

U.S. Cl. X.R.

307—88; 320—1; 331—167